United States Patent
Chaji et al.

(10) Patent No.: US 10,789,867 B2
(45) Date of Patent: *Sep. 29, 2020

(54) RE-INTERPOLATION WITH EDGE DETECTION FOR EXTRACTING AN AGING PATTERN FOR AMOLED DISPLAYS

(71) Applicant: Ignis Innovation Inc., Waterloo (CA)

(72) Inventors: Gholamreza Chaji, Waterloo (CA); Mehdi Torbatian, Waterloo (CA)

(73) Assignee: Ignis Innovation Inc., Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/555,256

(22) Filed: Aug. 29, 2019

(65) Prior Publication Data

US 2019/0385499 A1    Dec. 19, 2019

Related U.S. Application Data

(63) Continuation of application No. 16/227,256, filed on Dec. 20, 2018, now Pat. No. 10,438,524, which is a continuation of application No. 15/783,852, filed on Oct. 13, 2017, now Pat. No. 10,198,979, which is a continuation of application No. 15/363,290, filed on Nov. 29, 2016, now Pat. No. 9,818,323, which is a continuation of application No. 15/050,700, filed on
(Continued)

(51) Int. Cl.
| | |
|---|---|
| G09G 3/00 | (2006.01) |
| G06T 3/40 | (2006.01) |
| G09G 3/20 | (2006.01) |
| G09G 3/3208 | (2016.01) |
| G09G 5/02 | (2006.01) |
| G09G 3/3225 | (2016.01) |
| G09G 3/3233 | (2016.01) |

(52) U.S. Cl.
CPC ............. *G09G 3/006* (2013.01); *G06T 3/403* (2013.01); *G09G 3/2003* (2013.01); *G09G 3/2007* (2013.01); *G09G 3/2085* (2013.01); *G09G 3/3208* (2013.01); *G09G 3/3225* (2013.01); *G09G 3/3233* (2013.01); *G09G 5/026* (2013.01); *G09G 2320/0233* (2013.01); *G09G 2320/0242* (2013.01); *G09G 2320/043* (2013.01); *G09G 2320/045* (2013.01); *G09G 2320/0693* (2013.01); *G09G 2340/10* (2013.01)

(58) Field of Classification Search
CPC ...................................................... G09G 5/02
See application file for complete search history.

(56) References Cited

U.S. PATENT DOCUMENTS

| | | | |
|---|---|---|---|
| 2011/0227964 A1* | 9/2011 | Chaji | G09G 3/3225 345/690 |
| 2014/0055500 A1* | 2/2014 | Lai | G09G 3/3225 345/690 |

* cited by examiner

*Primary Examiner* — Phi Hoang
(74) *Attorney, Agent, or Firm* — Stratford Managers Corporation

(57) ABSTRACT

A method that includes an initial uniform pixel measurement and interpolation followed by an edge detection algorithm to recognize the areas that contribute mostly to the estimation error due to the interpolation. The pixels on the detected edges and around their vicinity are also measured, and an aging pattern of the entire display is obtained by re-interpolating the entire measured set of data for the initially measured pixels as well as the pixels around the detected edges. The estimation error is reduced particularly in the presence of aging patterns having highly spatially correlated areas with distinctive edges.

20 Claims, 14 Drawing Sheets

Related U.S. Application Data

Feb. 23, 2016, now Pat. No. 9,536,465, which is a continuation of application No. 14/209,392, filed on Mar. 13, 2014, now Pat. No. 9,305,488.

(60) Provisional application No. 61/783,537, filed on Mar. 14, 2013.

(B) Green (A) Red (C) Blue

RE-INTERPOLATION WITH EDGE DETECTION FOR EXTRACTING AN AGING PATTERN FOR AMOLED DISPLAYS

CROSS REFERENCE TO RELATED APPLICATIONS

This application is a continuation of U.S. patent application Ser. No. 16/227,256, filed Dec. 20, 2018, now allowed, which is a continuation of U.S. patent application Ser. No. 15/783,852, filed Oct. 13, 2017, now U.S. Pat. No. 10,198,979, which is a continuation of U.S. patent application Ser. No. 15/363,290, filed Nov. 29, 2016, now U.S. Pat. No. 9,818,323, which is a continuation of U.S. patent application Ser. No. 15/050,700, filed Feb. 23, 2016, now U.S. Pat. No. 9,536,465, which is a continuation of U.S. patent application Ser. No. 14/209,392, filed Mar. 13, 2014, now U.S. Pat. No. 9,305,488, which claims the benefit of U.S. Provisional Patent Application No. 61/783,537, filed Mar. 14, 2013, entitled "Re-Interpolation with Edge Detection for Extracting an Aging Pattern for Amoled Displays" both of which are hereby incorporated by reference in their entireties.

FIELD OF THE INVENTION

The present disclosure generally relates to circuits for use in displays, and methods of estimating or extracting aging patterns of displays, particularly displays such as active matrix organic light emitting diode displays.

BACKGROUND

Displays can be created from an array of light emitting devices each controlled by individual circuits (i.e., pixel circuits) having transistors for selectively controlling the circuits to be programmed with display information and to emit light according to the display information. Thin film transistors ("TFTs") fabricated on a substrate can be incorporated into such displays. TFTs tend to demonstrate non-uniform behavior across display panels and over time as the displays age. Compensation techniques can be applied to such displays to achieve image uniformity across the displays and to account for degradation in the displays as the displays age.

Consider an active matrix organic light-emitting device (AMOLED) display with $N_R$ rows and $N_C$ columns of pixels. Let Matrix X of size $N_R \times N_C$ represent the $V_T$ shift or the mobility index of the pixels across the screen. The problem is to estimate Matrix X with the minimum number of pixel measurement. Matrix X is used to adjust the input voltage of each individual pixel (compensation) to have a uniform intensity for all pixels of the screen.

There is a need to minimize the number of measurements to reduce the time interval required for non-uniformity compensation. This saving in time further allows repeating the same measurement multiple times to reduce the variance of the additive noise by averaging.

SUMMARY

The foregoing and additional aspects and embodiments of the present disclosure will be apparent to those of ordinary skill in the art in view of the detailed description of various embodiments and/or aspects, which is made with reference to the drawings, a brief description of which is provided next.

According to an aspect of the present disclosure, a method of identifying on a display having pixels that are aging due to shifts in one or more aging characteristics of a current-driven component in each of the pixels, comprising the acts of: measuring, using a measurement circuit, an aging characteristic of some but not all pixels in a first region of the display using a down-sampling rate of $K_V \times K_H$, such that the aging characteristic of at least every $K_V$th pixel is measured along a column of the first region and the aging characteristic of at least every $K_H$th pixel is measured along a row of the first region, to produce a set of initial pixel measurements. In an aspect, the first region covers almost all of the pixels on the display except for a few rows at the bottom and a few columns on the right side of the display. In another aspect, the first region covers all of the pixels of the display. $K_V$ and $K_H$ are positive integers that are identical or mutually distinct. The method further includes: interpolating the set of initial pixel measurements to produce an initial aging pattern for the first region; storing, in a memory device, the initial aging pattern; locating in the initial aging pattern using an edge detection algorithm an edge corresponding to a discontinuity in pixel intensity; measuring, using the measurement circuit, the aging characteristic of those of the pixels along the located edge in the initial aging pattern that were not measured in the first region to produce a set of edge measurements; applying a scattered interpolation algorithm using the set of initial pixel measurements and the set of edge measurements to produce a refined aging pattern of the first region; and storing an indication of the refined aging pattern in the memory device.

The method can further include measuring, using the measurement circuit, the aging characteristic of every $K_H$th pixel located in the last row of the display and of every $K_V$th pixel located in the last column of the display to include with the set of initial pixel measurements.

The method can further include, if the aging characteristic of the pixel located in the last column and in the last row of the display has not been measured so as to appear in the set of initial pixel measurements, measuring, using the measurement circuit, the aging characteristic of the pixel located in the last column and in the last row of the display to include with the set of initial pixel measurements.

The method can further include: further measuring, using the measurement circuit, the aging characteristic of at least some of the $K_H$ pixels horizontally and at least some of the $K_V$ pixels vertically from the located edge in the first region to produce a set of additional edge measurements; and adding the set of additional edge measurements to the set of edge measurements. The applying the scattered interpolation algorithm can be further based on the set of additional edge measurements.

The further measuring can include measuring the aging characteristic of at least every unmeasured pixel defined by a block having a size of at least $(K_H+1)(K_V+1)$, starting at an initial pixel along the located edge and including these further measured pixels in the set of additional edge measurements.

The further measuring can include measuring the aging characteristic of at least every one of the next $K_H$ unmeasured pixels located on the same row following the adjacent initial pixel along the located edge and of at least every one of the next $K_V$ unmeasured pixels located on the same column following the adjacent initial pixel and including these further measured pixels in the set of additional edge measurements.

The method can further include stopping the further measuring when an already measured pixel from the set of initial pixel measurements is encountered along the row or the column of the initial pixel.

The indication of the refined aging pattern can be an estimation matrix corresponding to the pixel resolution of the display, wherein the pixel resolution corresponds to a number $N_R$ of rows and a number $N_C$ of columns of pixels forming the display.

Each value in the estimation matrix can correspond to an amount by which the pixel corresponding to the row and the column where the value appears in the matrix is aging such that a compensation value is applied to increase a programmed brightness for the pixel to compensate for the aging amount.

The aging characteristic can be related to a shift in a threshold voltage of a drive transistor that drives a light emitting device in each of the pixels, or a change in a voltage across the light emitting device in each of the pixels, or a change in a drive current of the drive transistor needed to cause the light emitting device in each of the pixels to emit a programmed brightness, or a change in a current of the light emitting device needed to emit a programmed brightness.

Each of the pixels can include a light emitting device and a drive transistor that drives the light emitting device with a current corresponding to a programmed brightness emitted by the light emitting device.

The first region can span the entire display or nearly all of the entire display. When the first region spans most but not the entire display, there can be one to three additional disjoint regions that together with the first region span the entire display. For example, a second region can include a thin vertical region comprising the first few columns on the right side of the display. A third region can include the bottom few rows on the bottom of the display. A fourth region can include a small rectangular region comprising a few pixels on the bottom right hand side of the display. Depending on the size of the display, $N_R \times N_C$, and the down-sampling rate, $K_H \times K_V$, there may be only one region (a first region), or one to three additional regions.

The interpolating the set of initial pixel measurements can estimate aging values of pixels that were not measured in the first region due to the down-sampling rate.

The edge detection algorithm can be a Canny edge detection algorithm.

$K_V$ can be 2 or 4 or any other positive integer, and $K_H$ can be 2, 3, or 4 or any other positive integer.

No more than 50% of all the pixels in the display can be measured to produce the initial aging pattern, or no more than 25% of all the pixels in the display can be measured to produce the initial aging pattern. The number of pixels that are initially measured depends on the down-sampling rate. For example, if $K_V = K_H = 2$, almost 25% of all the pixels in the display are initially measured. As another example, if $K_V = K_H = 4$, only 1/16 of all the pixels are initially measured.

The method can further include: measuring, using the measurement circuit, the aging characteristic of some but not all pixels in a second region of the display, to include with the set of initial pixel measurements, the first region and the second region being disjoint, wherein the interpolating produces the initial aging pattern for the first region and the second region. The edge detection algorithm is run on the entire display to locate edges

BRIEF DESCRIPTION OF THE DRAWINGS

The foregoing and other advantages of the disclosure will become apparent upon reading the following detailed description and upon reference to the drawings.

Figure 1:
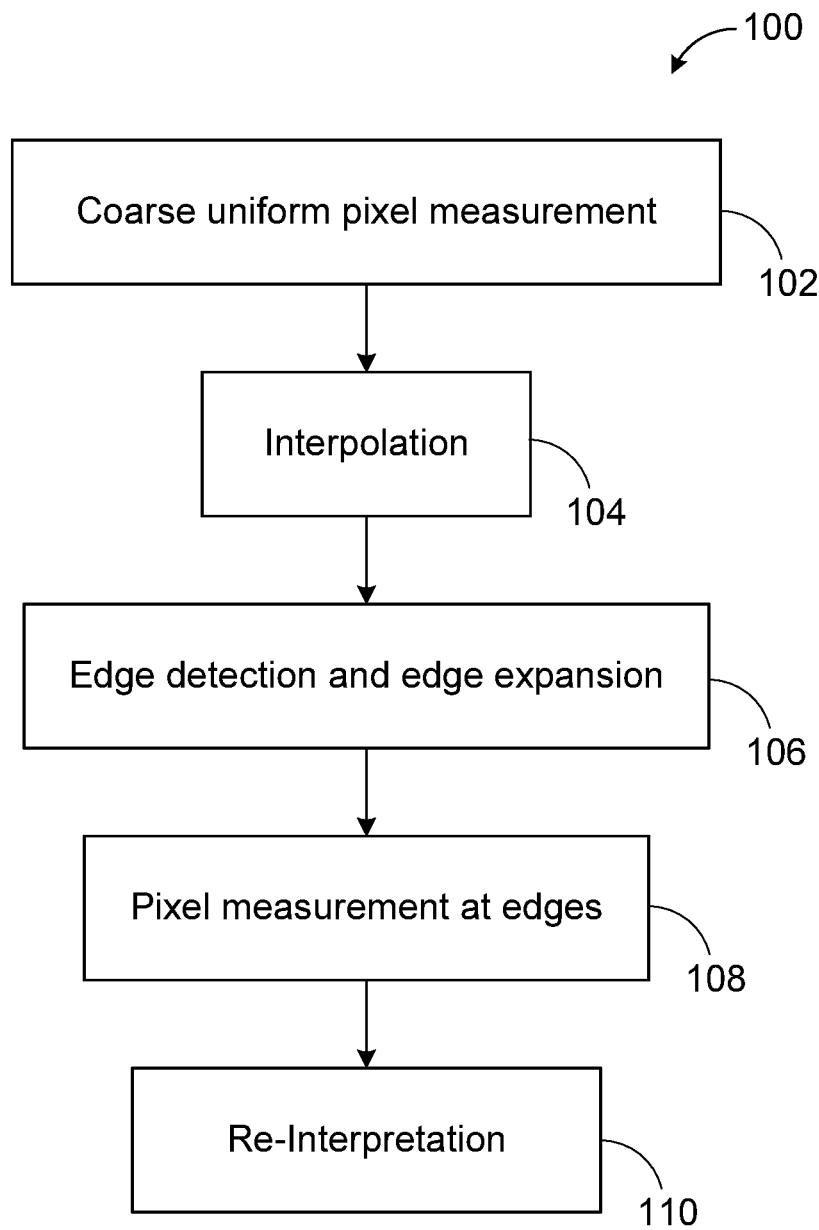
FIG. 1 shows a block diagram of the algorithm according to an aspect of the present disclosure.

While the present disclosure is susceptible to various modifications and alternative forms, specific embodiments have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of the invention as defined by the appended claims.

DETAILED DESCRIPTION

While particular embodiments and applications of the present disclosure have been illustrated and described, it is to be understood that the disclosure is not limited to the precise construction and compositions disclosed herein and that various modifications, changes, and variations can be apparent from the foregoing descriptions without departing from the spirit and scope of the invention as defined in the appended claims.

The aging pattern of a screen or display is highly spatially correlated. For displays having low correlated or uncorrelated aging patterns, most or even all of the pixels need to be measured to ascertain their aging characteristic. However, due to high spatial correlation, the aging pattern of the display can be estimated from measuring a proper subset of all pixels in the display. The present disclosure presents a class of approaches that are based on pixel measurement. An algorithm which is easy to implement and works based on measuring a non-uniform subset of pixels to estimate the aging pattern of the display is presented.

Referring to FIG. 1, an algorithm starts with an initial uniform (by uniform, it is meant that a regular or uniform pattern of pixels are measured) measurement of a characteristic (e.g., aging) of the pixels with a specific down-sampling rate $K_V \times K_H$, such as for example 4×4, which means that the aging characteristic of the pixel in every $4^{th}$ row and every $4^{th}$ column is measured while other pixels in each 4×4 block of pixels are not measured in this initial uniform measurement of the algorithm 100 (102). Assuming a high spatial correlation, a coarse aging pattern of the entire display (including non-measured pixels) is obtained by interpolating the measured data (104). Most of the error due to interpolation can happen at or near the vicinity of the edges where image brightness levels change abruptly. Accordingly, an edge detection algorithm is run to detect the edges where sudden brightness levels occur (106). Then, the aging pattern is further refined by making extra pixel measurements at or around the detected edges (108) and then re-interpolating the measured aging data across the entire display (110).

An initial pixel measurement is performed with the down-sampling rate of $K_V \times K_H$. Starting from a corner of the display (e.g., the upper-left corner) with the coordinate (0,0), the pixels located at integer multiples (e.g., 4) of the vertical and horizontal parameters of the down-sampling rate are measured. Depending on the size of the display and the selected down-sampling rate, a few last rows ($n_r < K_V$) and a few last columns ($n_c < K_H$) of the pixels may not be measured during this initial pixel measurement using the selected down-sampling rate. Prior to interpolating for all the pixels of the display, aging characteristics of the pixels at the very last row and the very last column of the display are measured with the same down-sampling rates $K_H$ and $K_V$, respectively. The pixel at the location corresponding to the bottom right of the display ($N_r$, $N_c$) can also be measured as part of the initial measurement. The aging characteristics of the measured pixels are stored as a set of initial pixel measurements in a memory device. The parameters of the down-sampling rate, $K_V$ and $K_H$, are integers and can be identical (e.g., 2×2 or 4×4) or mutually distinct (e.g., 2×4).

Depending on the size of the display and the selected down-sampling rate $K_V \times K_H$, the display can be (at most) divided to four disjoint (distinct) regions to which the uniform measurement is applied. This is due to the fact that the coordinates of the last row and the last column of pixels may not be integer factors of the selected down-sampling rate, and, so they can be measured separately. If the measurement is started from the upper-left corner of the screen, for example, these regions are located at the upper left, lower left, upper right, and the lower right parts of the display, respectively. In each region, a grided interpolation algorithm is run to estimate the unknown entries of the matrix X, which again has a size corresponding to the pixel resolution of the display and where the known entries correspond to the measured characteristics, and the unknown entries are interpolated.

Various conventional methods of interpolation such as "nearest neighbor," "linear," "cubic," or "spline" can be used. In case that cubic or spline interpolation methods are deployed, the interpolated data in region 1 can be used to provide extra data needed to complete interpolation in regions 2 and 3. Similarly, the interpolated data in regions 1, 2, and 3 can be used to complete the interpolation in region 4. Alternatively, the pixels required for interpolation at regions 2, 3, 4 can be directly measured.

Because edges happen due to abrupt changes in the intensity or brightness of surrounding pixels, they can result in local maximums in the gradient magnitude of the image. This phenomenon allows detection of the edges using image signal processing by finding the local maximums of the gradient of the image. Conventional edge detection algorithms such as "sobel," "prewitt," "log," and "roberts" work according to this principle, and are suitable for use in detecting the local maximums of the image gradient.

A more advanced edge detection algorithm which works based on finding and tracking the local maximums of the gradient is a "canny" edge detector which was developed by John F. Canny in 1986. The canny edge detector can be used herein due to its precise detection and location of connected edges and accordingly more precise recognition of different aged areas of the display.

The output of the canny edge detector is a binary matrix with the same size of the original image (i.e., the same size as matrix X) in which the edge entries (e.g., local maxima) are marked by a binary value of one and the rest of the entries in the binary matrix are zero.

Assuming that the canny edge detector finds the location of the edges precisely, the location of each edge can still have an error of at most $K_V \times K_H$ pixels due to the down-sampling resolution of the initial interpolation. Three different approaches can be used to reduce the error.

A coarse or "brute force" approach is to measure all $(K_V+1) \times (K_H+1)$ pixels between the four initial measurements around the detected edge. When the edge is placed on an initially measured pixel, the $(K_V+1) \times (K_H+1)$ pixels horizontally on the right and vertically below the current pixel (starting from the edge pixel itself) are measured. For example if $K_V = K_H = 4$, there are 25 pixels around the edge pixel that need to be measured. Because four of them have already been measured during the initial measurement (and are already in the set of initial pixel measurements), a total of at most 21 pixels around the detected edge pixel are measured. However, this approach can result in too many new pixels being measured without a material reduction of error.

To reduce the number of additional measurements, another approach measures a total of $(K_H+1)$ horizontal and $(K_V+1)$ vertical pixels around the detected edge and between the coordinates of the adjacent initially measured pixels. When the edge is placed on an initially measured pixel, the $(K_H+1)$ horizontal and the $(K_V+1)$ vertical pixels on the right of the edge pixel and below the edge pixel (including itself) is measured. Assuming $K_H = K_V = 4$, a total of at most 10 pixels around the edge pixel are measured using this approach.

To further reduce the number of additional measurements, yet another approach measures a total of at most $(K_H+1)$ pixels on the right of the edge pixel and a total of at most $(K_V+1)$ vertical pixels below and including the edge pixel. The measurement can be stopped when the coordinates of a next initially measured pixel are reached. In this approach, at most (Kh+1) pixels horizontally and $(K_V+1)$ pixels vertically are measured.

Note that in all the above approaches, the new pixels that are measured can overlap with previously measured pixels due to the initial measurement or due to the extra measurement for other pixels at edges. These new pixels are skipped as they have already been measured. The additional pixels that are measured following the initial interpolation produce a set of edge measurements.

The new set of measured data now includes the initial pixel measurements (set of initial pixel measurements) plus the new measurements at the edges and their vicinity (set of edge measurements). This new data set is not a grided set of data because the edges do not necessarily follow a grided pattern. Thus, a scattered data interpolation technique is used to interpolate this new data set having an irregular or non-grid pattern of measured data. The re-interpolation using a scattered data interpolation results in a more accurate estimation of the aging pattern with less error compared to the initial interpolation alone.

The performance of the algorithm is evaluated for both simulated and real data of an AMOLED display. The normalized root mean square (RMS) error percentage is considered as the performance criterion. If X and $\hat{X}$ are respectively the original and the estimated matrices, the normalized error can be defined as:

$$E \triangleq \frac{norm(X - \hat{X})}{norm(X)} \times 100$$

It is assumed that the average value of the entries of matrix X is zero, otherwise it is taken off from every single entry of the matrix X. This is necessary to highlight the estimation error. Otherwise, the more is the average value, the less is the estimation error.

Figure 2:
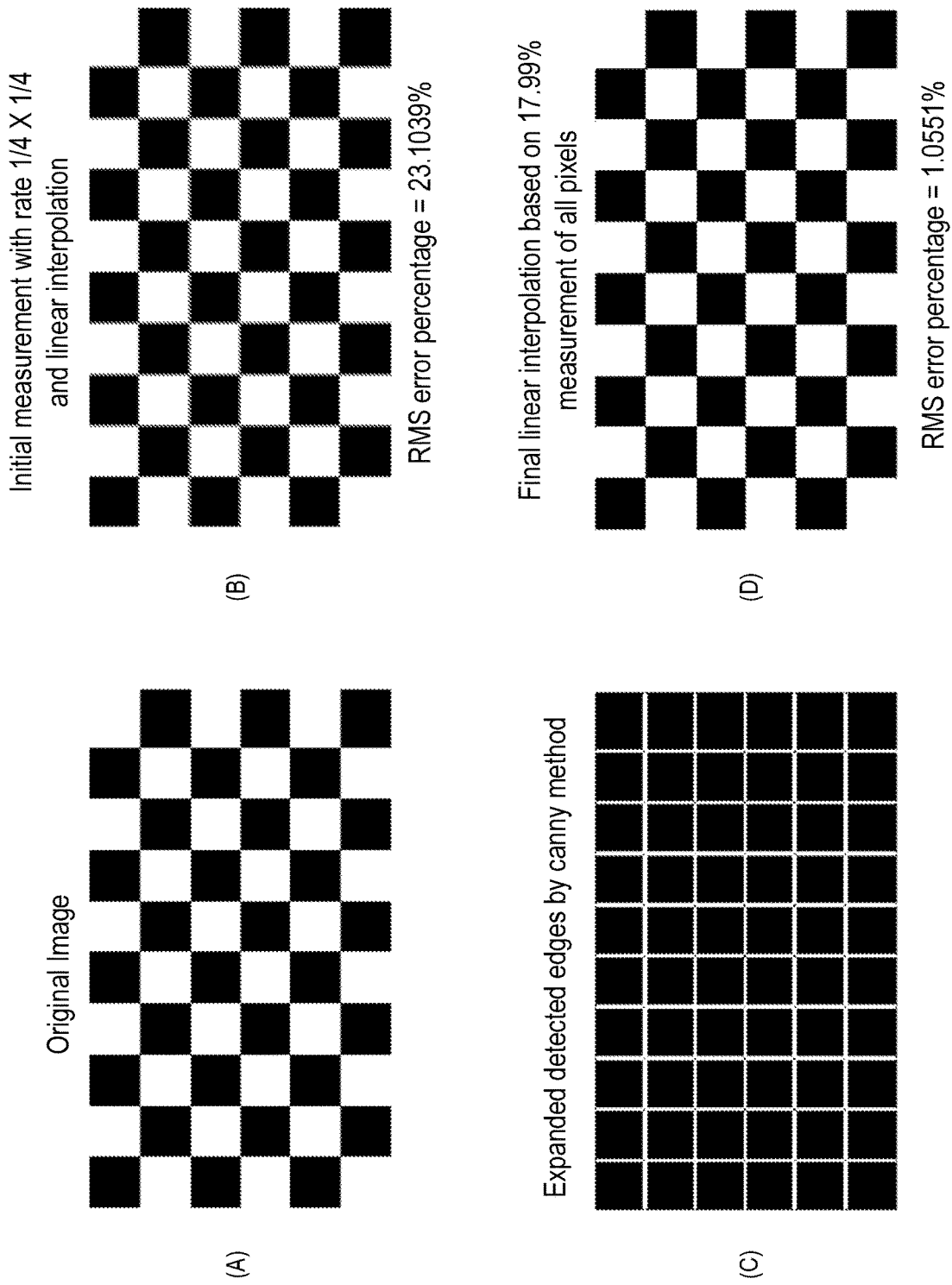
FIG. 2 shows results of simulated chess aging patterns of size 6×10

Four different simulated aging patterns respectively called "chess," "random intensity chess," "diamond," and "random intensity diamond" can be considered. The goal is twofold at this stage: 1) to determine a minimum number of measurements for a fixed pattern to achieve a reasonable estimation error, and 2) to observe the minimum size of the aged areas on the display in which the algorithm still shows a desirable performance. The simulated patterns can be added to a background of real data acquired from an AMOLED display. The performance of the algorithm is also evaluated in this case FIG. 2(A) shows a simulated chess aging pattern having a size 6×10 (black and white blocks) across a display having a size of 384×648 pixels. The size of each block in this example is 64×64 pixels. The initial pixel measurement is performed with the down-sampling rate of 4×4. FIG. 2(B) shows an image obtained by a linear interpolation of the measured data using the down-sampling rate. The normalized RMS estimation error is 23.1039%. FIG. 2(C) shows the edges detected by a canny edge detector. Note that the edges can be expanded as explained before to cover their vicinity. FIG. 2(D) illustrates the re-interpolated image in which new data at and/or near the detected edges are taken into account. The normalized RMS error improves to 1.0551% but at a cost of measuring 17.99% of all the pixels on the display.

In another example, the initial pixel measurement is performed with the down-sampling rate of 2×3. In this example, more than 16.6% of all pixels are measured uniformly. This value is comparable with the obtained from the previous example as the total percentage of the pixel measurements, 17.99% value. The initial interpolation in this example results in a normalized RMS error of 14.9986%. This indicates that the algorithm results in more than a 13% improvement in the normalized RMS error compared to the case in which almost the same number of pixels is measured uniformly across the display.

Figure 3:
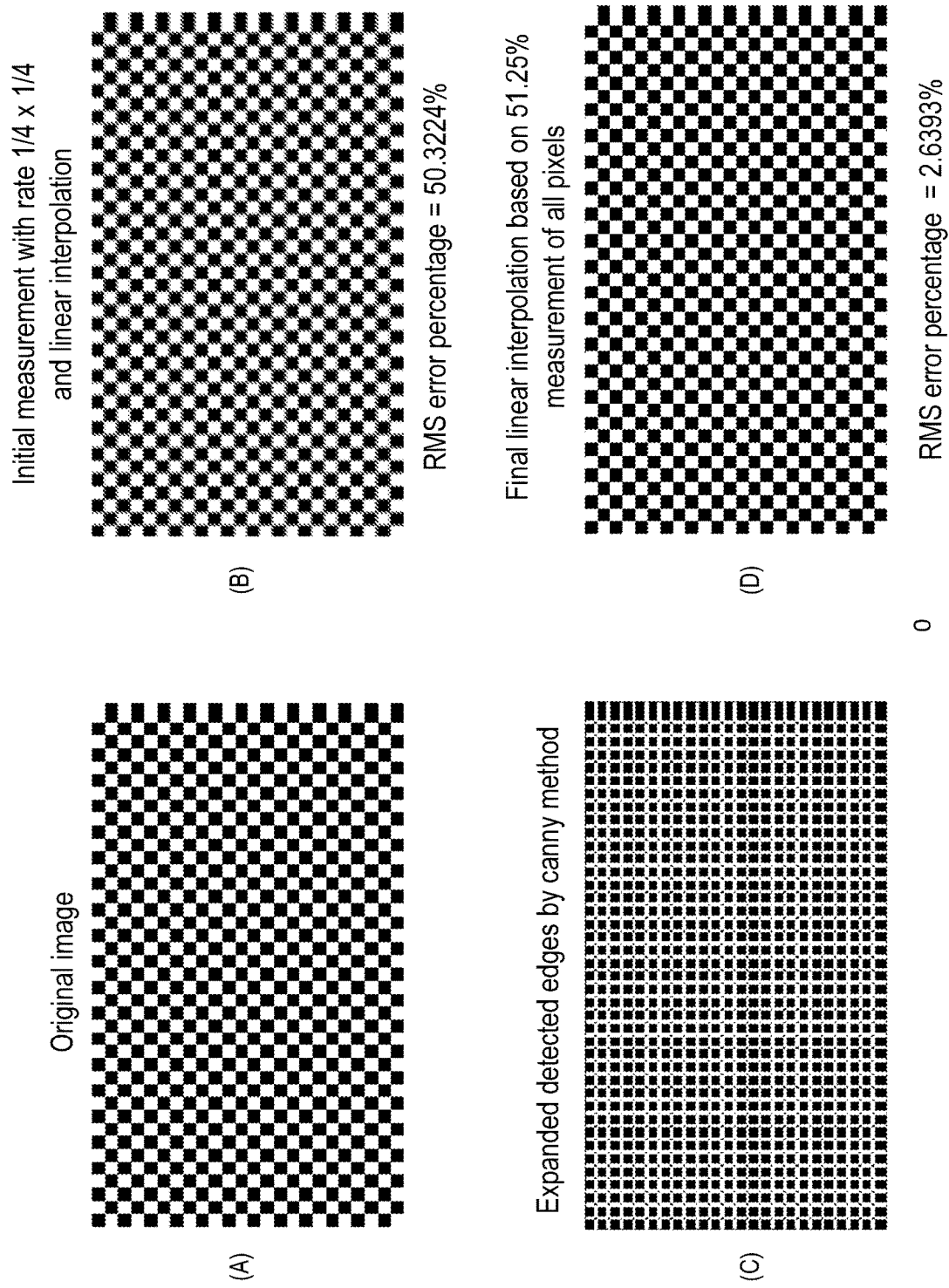
FIG. 3 shows results of simulated chess aging patterns of size 24×40

FIG. 3 shows the results of the same simulation with a chess aging pattern of size 24×40. In this example, the size of each block is 16×16 pixels. Notice that the RMS error percentage after the initial interpolation is 50.3224%. It improves to 2.1963% following Canny edge detection and re-interpolation. This gain is achieved at a cost of measuring 51.26% of all pixels. Consistent with the previous simulation, it is seen that if the initial down-sampling rate were chosen as 2×1, i.e., when more than half of the pixels are measured uniformly, the RMS error percentage improves to 24.5427%. This translates to achieving more than a 22% performance improvement, which is due to an intelligent choice of pixels that are measured. As can be seen, the algorithm performs very well even for a very small size of aged areas (e.g., as small as 16×16 pixels).

Figure 4:
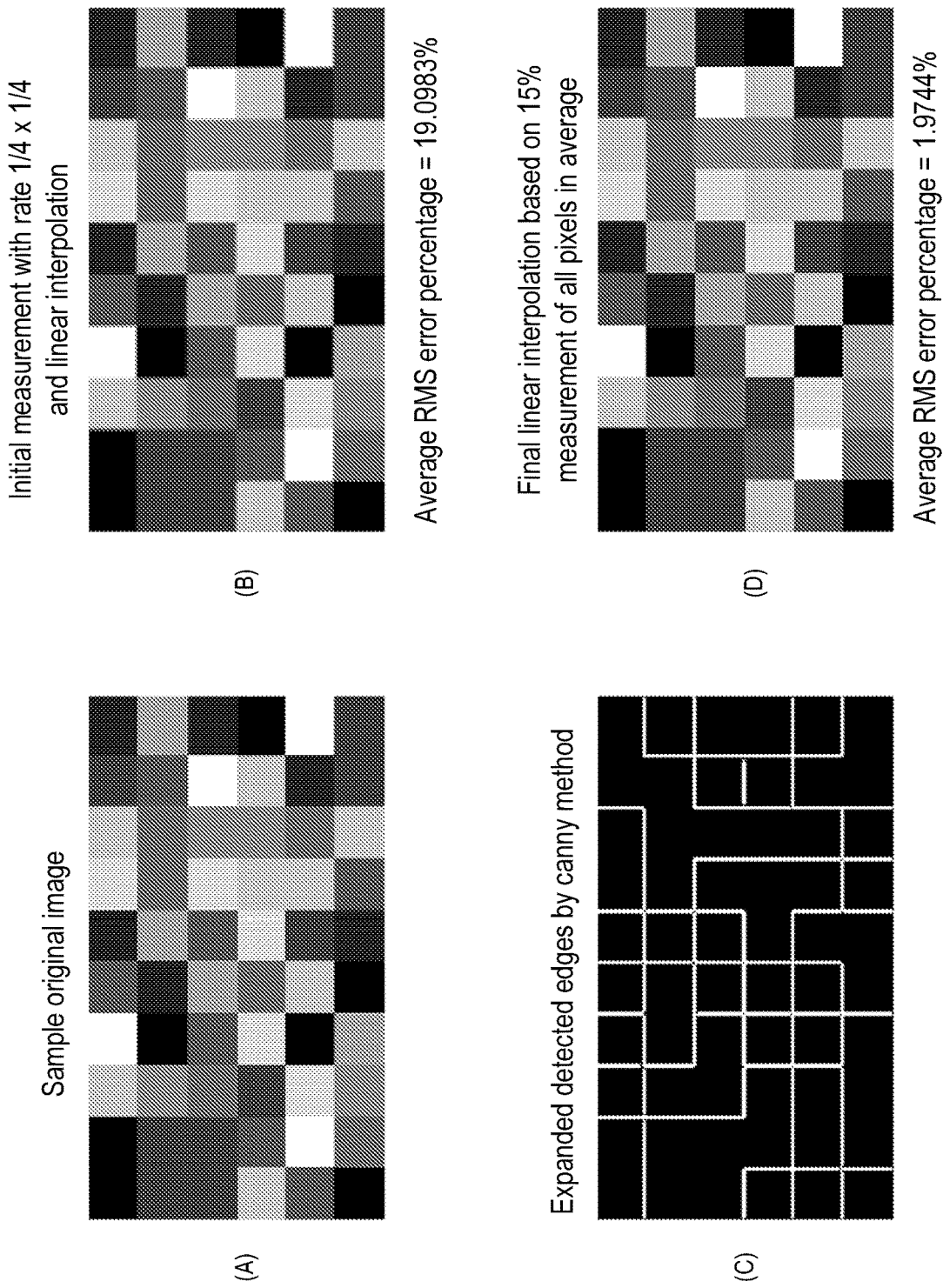
FIG. 4 illustrates the performance of the algorithm for a random intensity chess pattern of size 6×10 blocks.

In random intensity chess pattern each of the blocks chooses a random intensity level from the set {0, 0.1, 0.2, . . . , 1}. FIG. 4 illustrates the performance of the algorithm for an instant of this pattern of size 6×10 blocks. The simulation procedure is the same as that of the chess pattern. Note that the average RMS error and the average percentage of the total pixel measurement have been shown on the figure. These values were obtained based on 50 independent runs of the algorithm. As can be seen, the final average estimation error is 1.9744%, which is obtained at the cost of 15% average measurement of all pixels. In contrast, if the original image is sampled with the down-sampling rate of 2×3 and is linearly interpolated, the average RMS error equal to 12.29% is achieved. Thus, the algorithm provides more than 10% gain in average compared to a uniform measurement of pixels.

Figure 5:
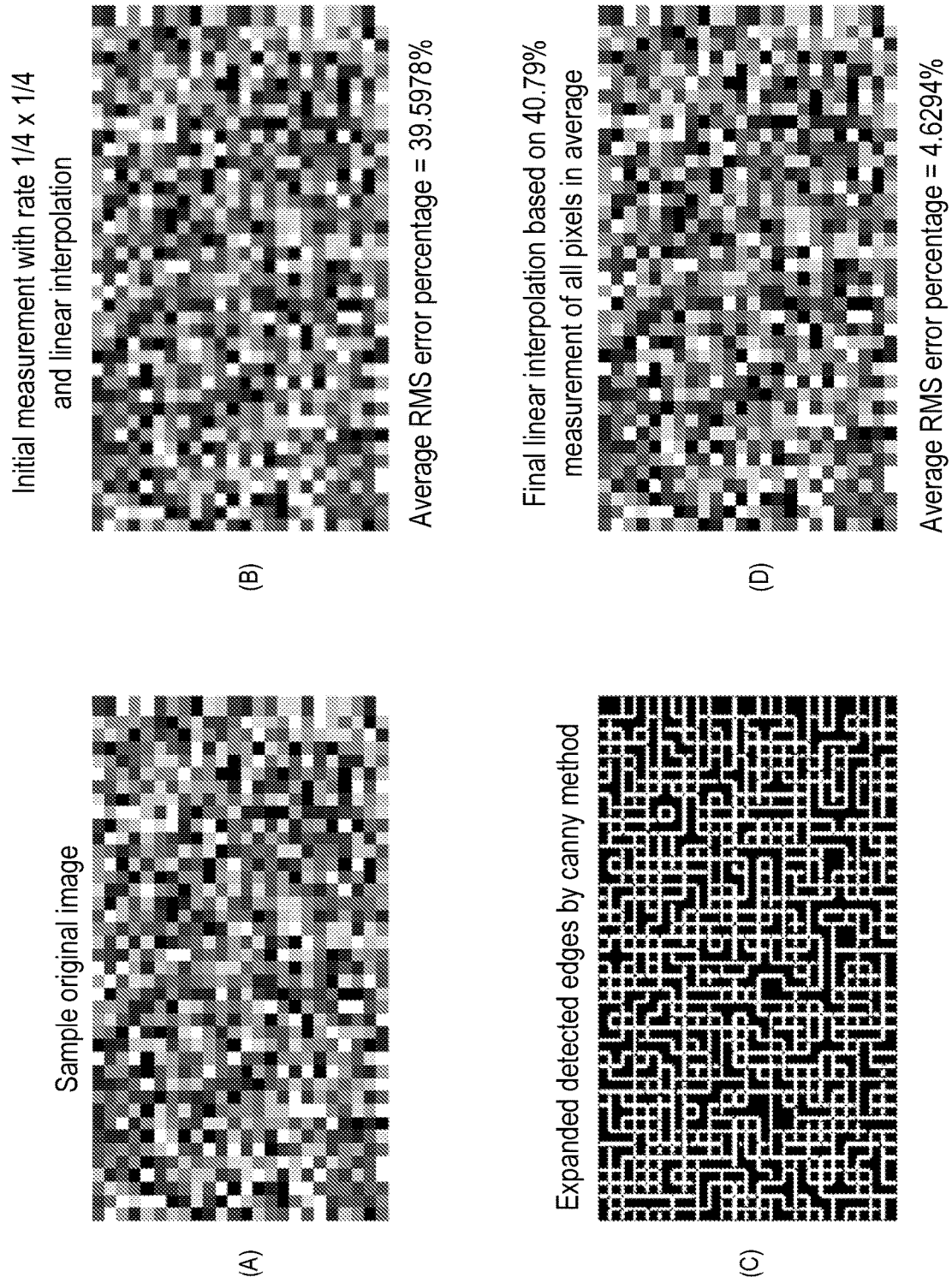
FIG. 5 illustrates the results of the same simulation when the random intensity chess pattern of size 24×40 is considered.

FIG. 5 illustrates the results of the same simulation when a random intensity chess pattern of size 24×40 is considered. The final average RMS error is 4.6394%, which is obtained at the cost of 40.79% average measurement of all pixels. By contrast, if the original image is sampled by the down-sampling rate of 2×1 and is interpolated, the average RMS error is 19.3118%. Thus, the algorithm provides more than 14% gain compared to the uniform measurement of pixels. The algorithm also performs very well even for very small size of aged areas (as small as 16×16 pixels). Table 1 summarizes the results for the chess and the random intensity chess aging patterns.

TABLE 1

Performance of the algorithm for simulated aging patterns

| | Chess | Random Int. Chess | Diamond | Random Int. diamond |
|---|---|---|---|---|
| Pattern size | 6 × 10 | 6 × 10 | 6 × 10 | 6 × 10 |
| Initial down-sampling rate | 4 × 4 | 4 × 4 | 4 × 4 | 4 × 4 |
| Initial RMS error % | 23.1 | 19.1 | 11.1 | 10.1 |
| Total pixel measurement % | 18 | 15 | 25.03 | 21.33 |
| Final RMS error % | 1.06 | 1.97 | 1.23 | 1.3 |
| Equivalent down-sampling rate | 2 × 3 | 2 × 3 | 2 × 2 | 2 × 2 |
| Equivalent RMS error % | 15 | 12.29 | 8.23 | 7.50 |
| Gain % | >13 | >10 | >7 | >6 |

Figure 6:
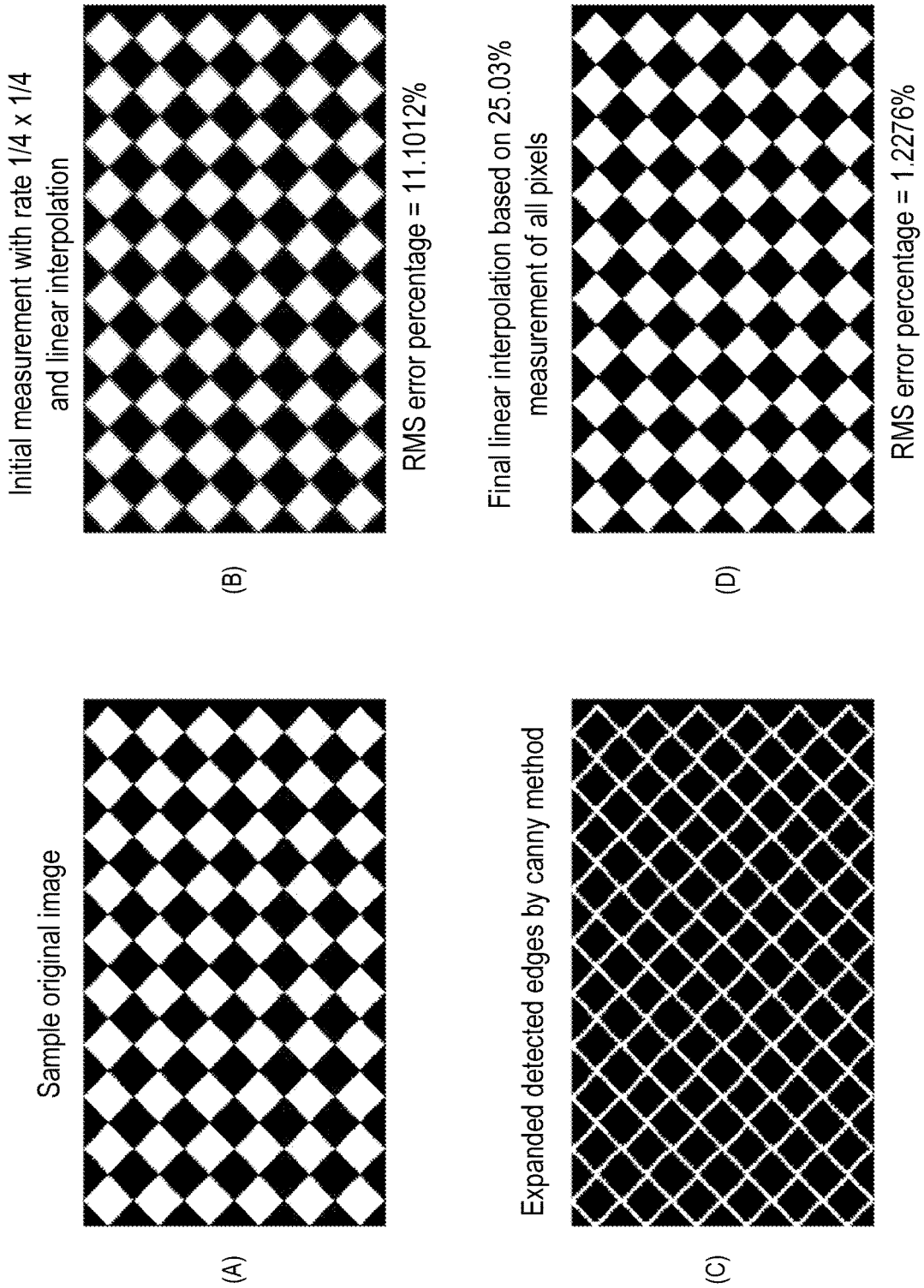
FIG. 6 illustrates the performance of the algorithm on the diamond aging pattern of size 6×10.
Figure 7:
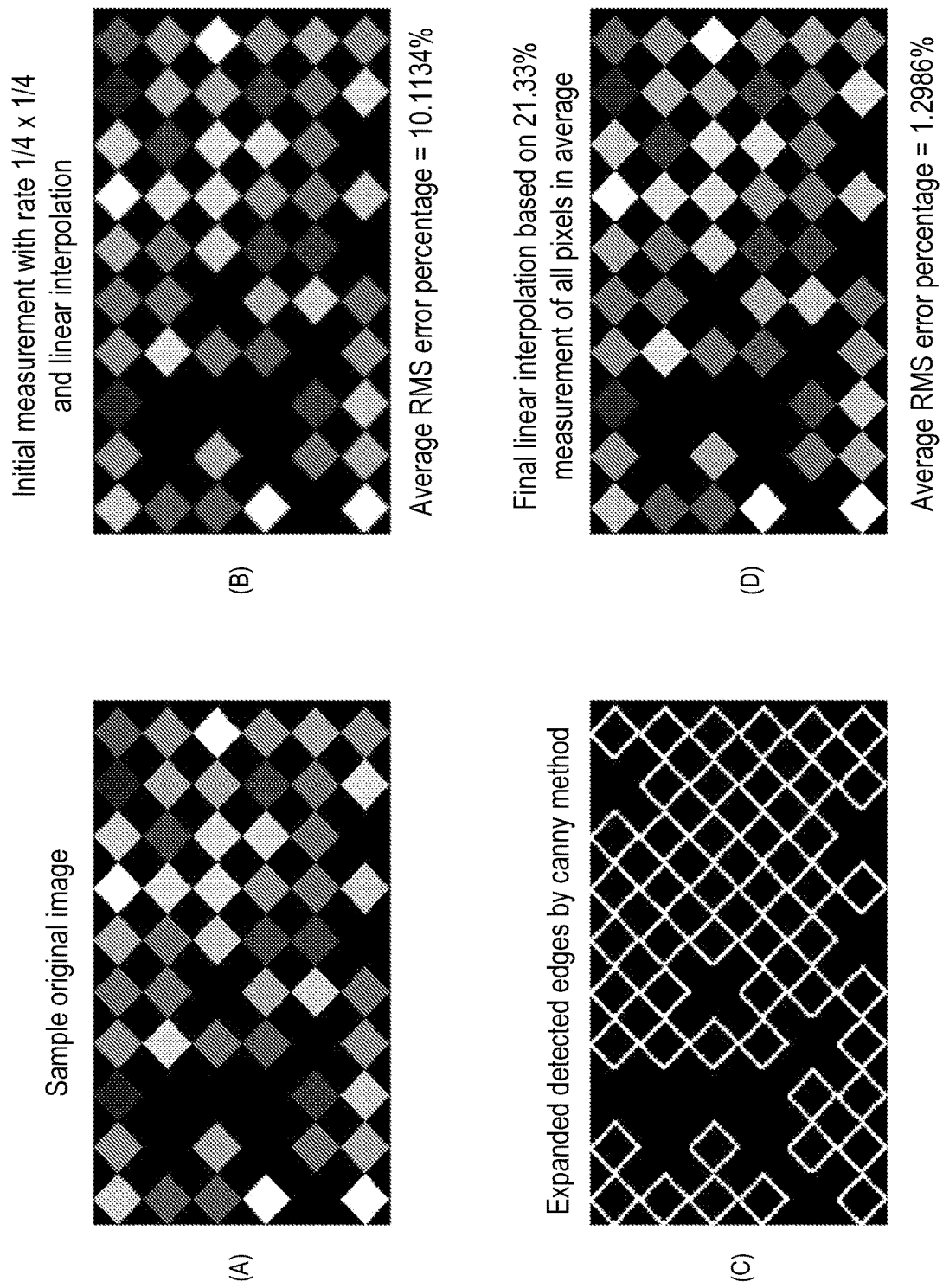
FIG. 7 illustrates the performance of the algorithm on the random intensity diamond pattern of size 6×10.

To verify the performance of the algorithm for edges with 45 and 135 edge direction degrees, a diamond aging pattern and the random intensity diamond pattern is designed as shown in FIGS. 6 and 7. The same simulation procedure as before is performed for both cases. In FIG. 6, the final RMS error is 1.2276%, which is obtained at the cost of 25.03% measurement of all pixels. For comparison, if the initial down-sampling rate equal to 2×2 is chosen, the RMS percentage error equal to 8.2349% is obtained. Thus, the algorithm provides more than 7% improvement in comparison to a uniform measurement of the pixels.

The algorithm was run 50 times for the random intensity diamond pattern and the results were averaged. The averaged final estimation error is 1.2986%, which is obtained at the cost of 21.33% percent measurement of all pixels on average. If the display is initially sampled with the down-sampling rate of 2×2 and the resulted data is linearly interpolated, the average RMS error is 7.5091%. Thus, the algorithm results in more than 6% improvement compared to a uniform pixel measurement approach. Table 1 above summarizes the results for the diamond and the random intensity diamond aging patterns.

Figure 8:
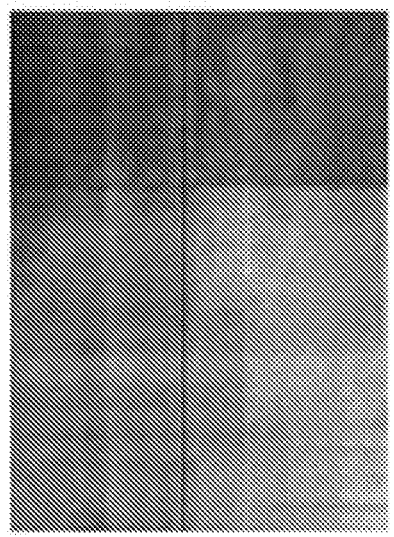
FIG. 8 illustrates $V_T$ initial non-uniformities for Red, Green, and Blue colors of an AMOLED display of size 512×648.
Figure 8:
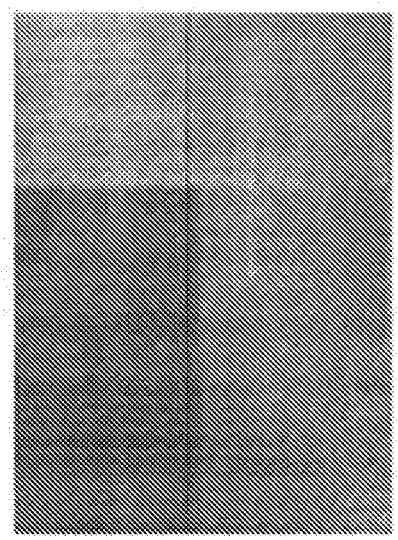
Figure 8:
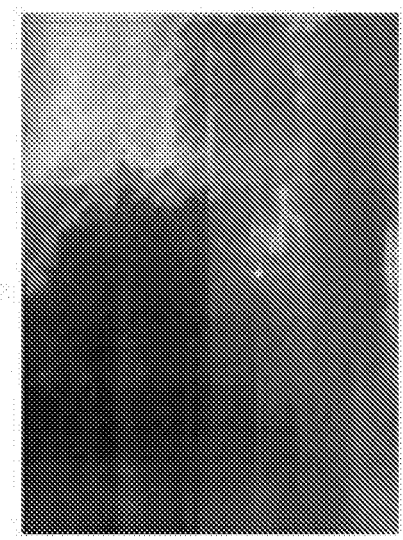

In the following section, the random intensity chess and the random intensity diamond aging patterns are considered on a background of initial non-uniformity measured from an AMOLED display of size 512×648 pixels. FIG. 8 illustrates the $V_T$ initial non-uniformity of this display for Red, Green, and Blue colors. In these images, those values that are away from the mean (m) more than 10 times the standard deviation ($\sigma$) are considered as false measurements and are replaced by the mean value. Those that are away from the mean 5 times the standard deviation are replaced by the boundary values, m±5$\sigma$. Then the data is filtered out by the 3×3 Gaussian filter to reduce the effect of the noise and to avoid pixel-by-pixel variation.

Figure 9:
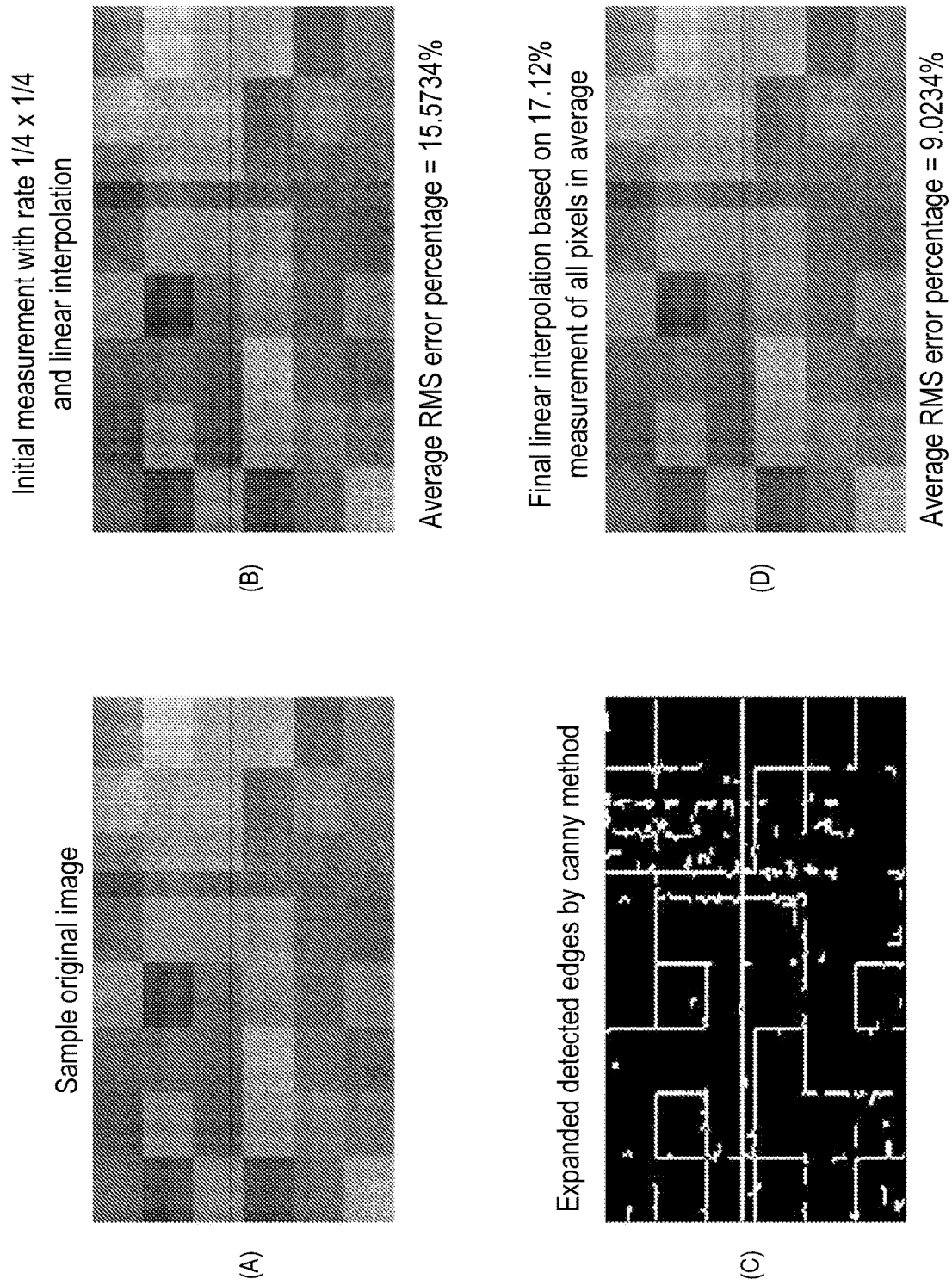
FIG. 9 shows the performance of the algorithm on the random intensity chess pattern with background real initial non-uniformity for red color.
Figure 10:
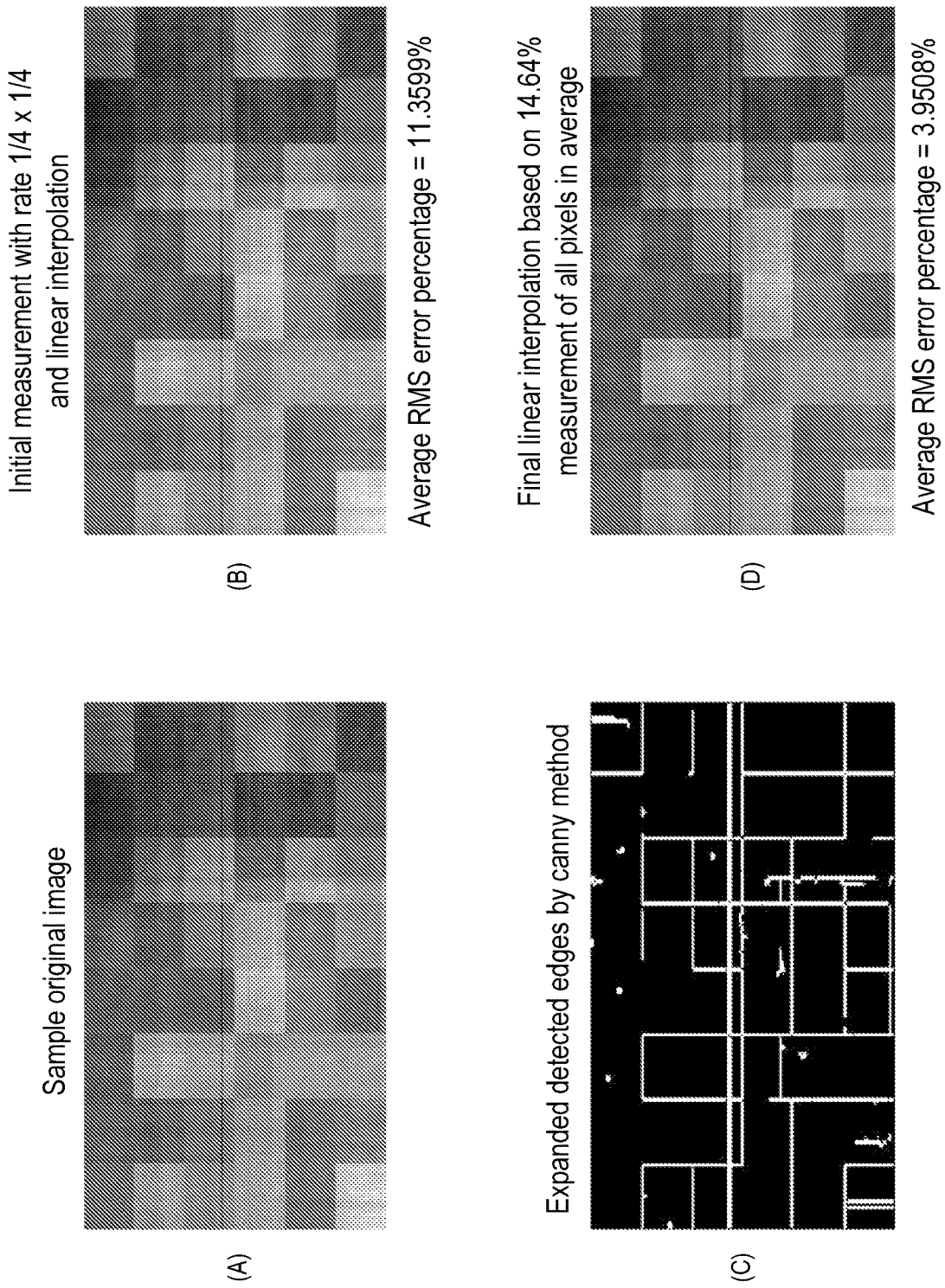
FIG. 10 shows the performance of the algorithm on the random intensity chess pattern with background real initial non-uniformity for green color.
Figure 11:
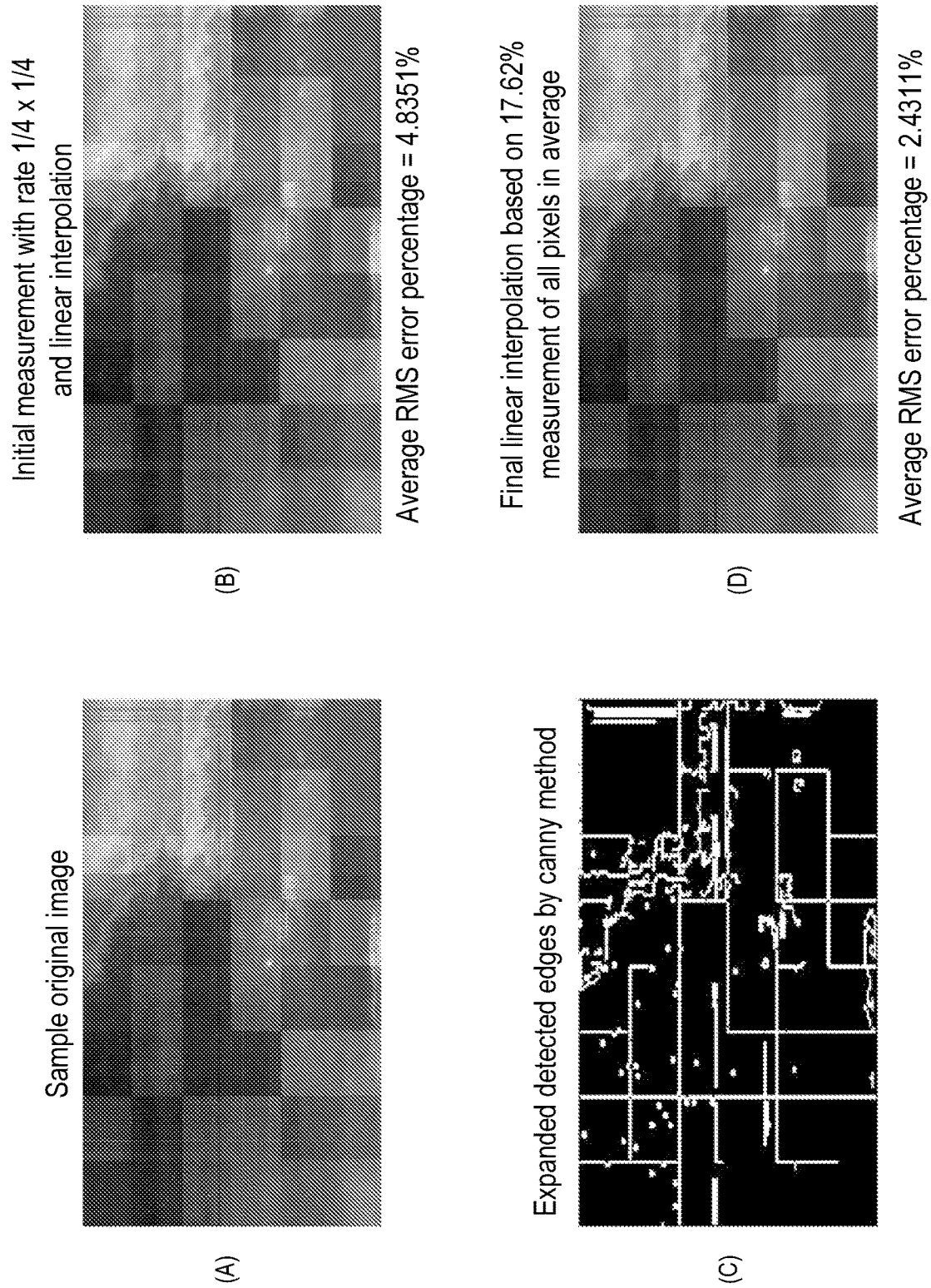
FIG. 11 shows the performance of the algorithm on the random intensity chess pattern with background real initial non-uniformity for blue color.

FIGS. 9, 10, and 11 show the performance of the algorithm for a random intensity chess pattern of size 6×10 with a background having real initial non-uniformity for red, green, and blue colors, respectively. The maximum intensity of the random chess pattern that is added to the initial non-uniformity data is 0.1 times the mean of the initial non-uniformity of the display. This means that the aging process is in an early stage, and the display is at most 10% aged compared to its original condition. The average RMS errors equal to 9, 3.95, and 2.43 percent are obtained at the cost of total 17.12, 14.64, and 17.62 percent measurement of all pixels on average respectively for red, green, and blue colors. To obtain the actual value of the performance improvement for each color, initial measurements of the display with a down-sampling rate of 2×3 were taken, which means that more than 16.6% of the pixels are measured uniformly. In this case, the average RMS errors equal to 14.7, 10.64, and 3.58 percent are obtained respectively for red, green, and blue colors. This translates to more than 5%, 6%, and 1% performance improvement respectively. The results are summarized in Table 2 below.

Figure 12:
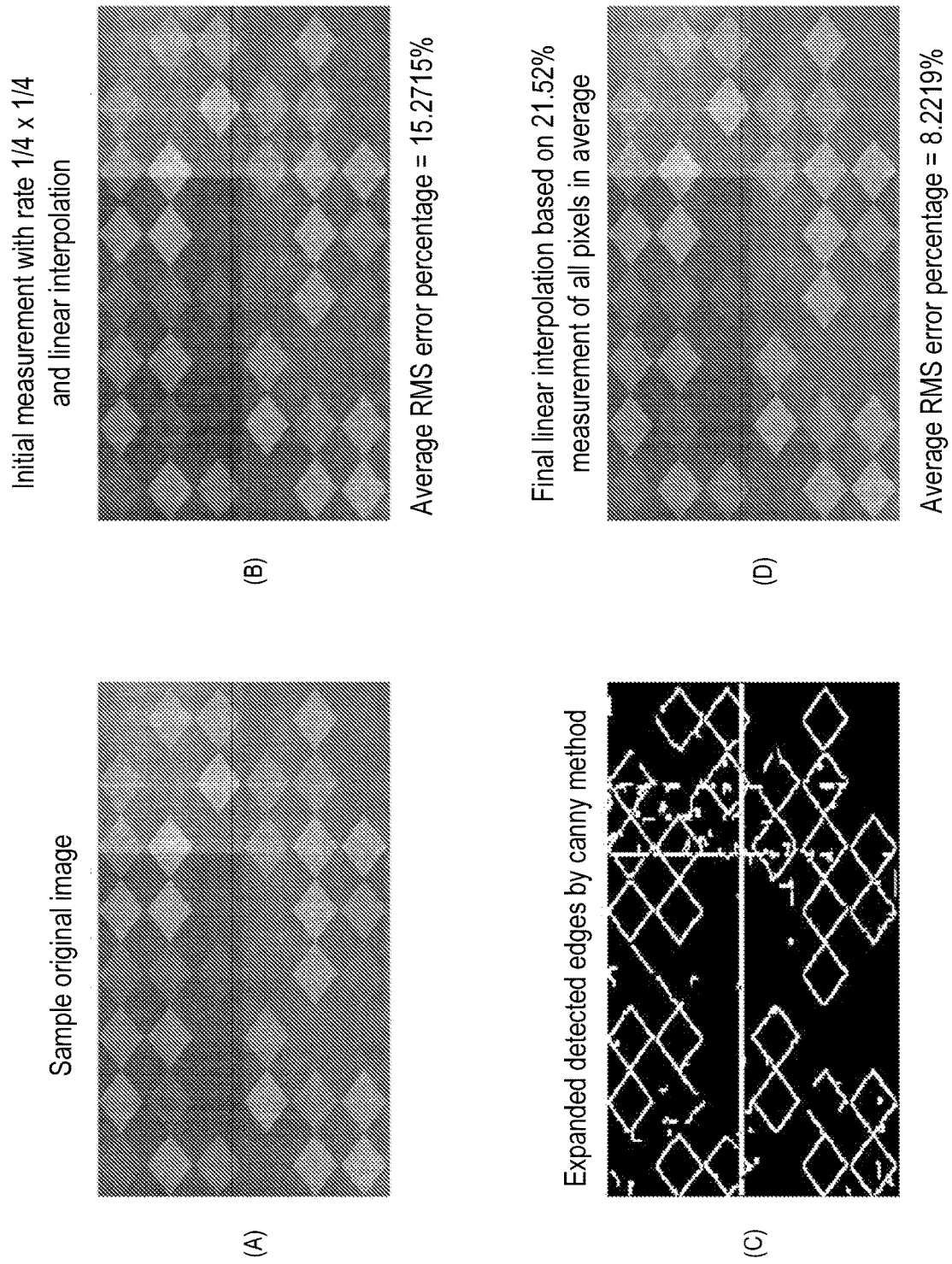
FIG. 12 shows the performance of the algorithm on the random intensity diamond pattern with the background of real initial non-uniformity for red color.
Figure 13:
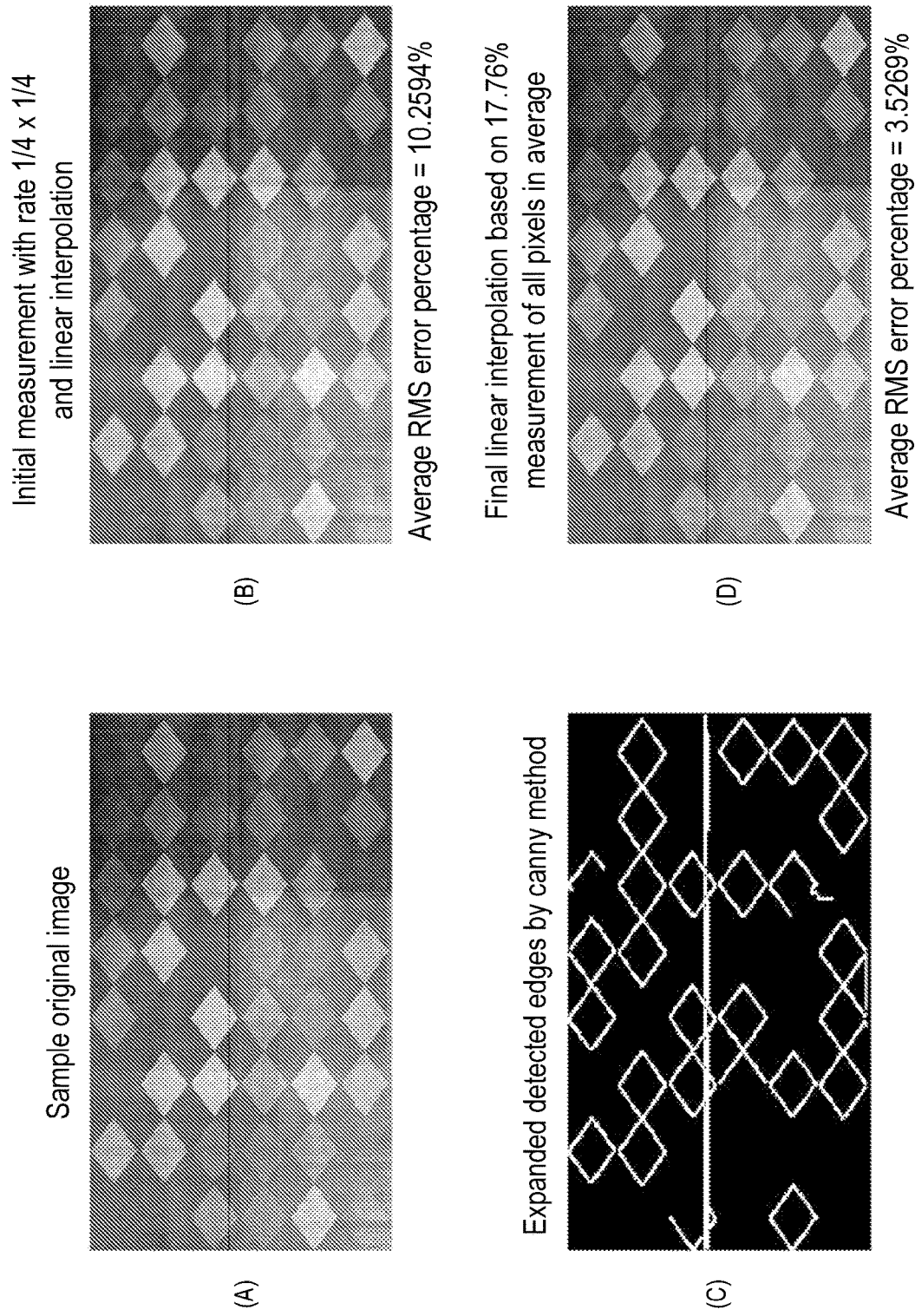
FIG. 13 shows the performance of the algorithm on the random intensity diamond pattern with the background of real initial non-uniformity for green color.
Figure 14:
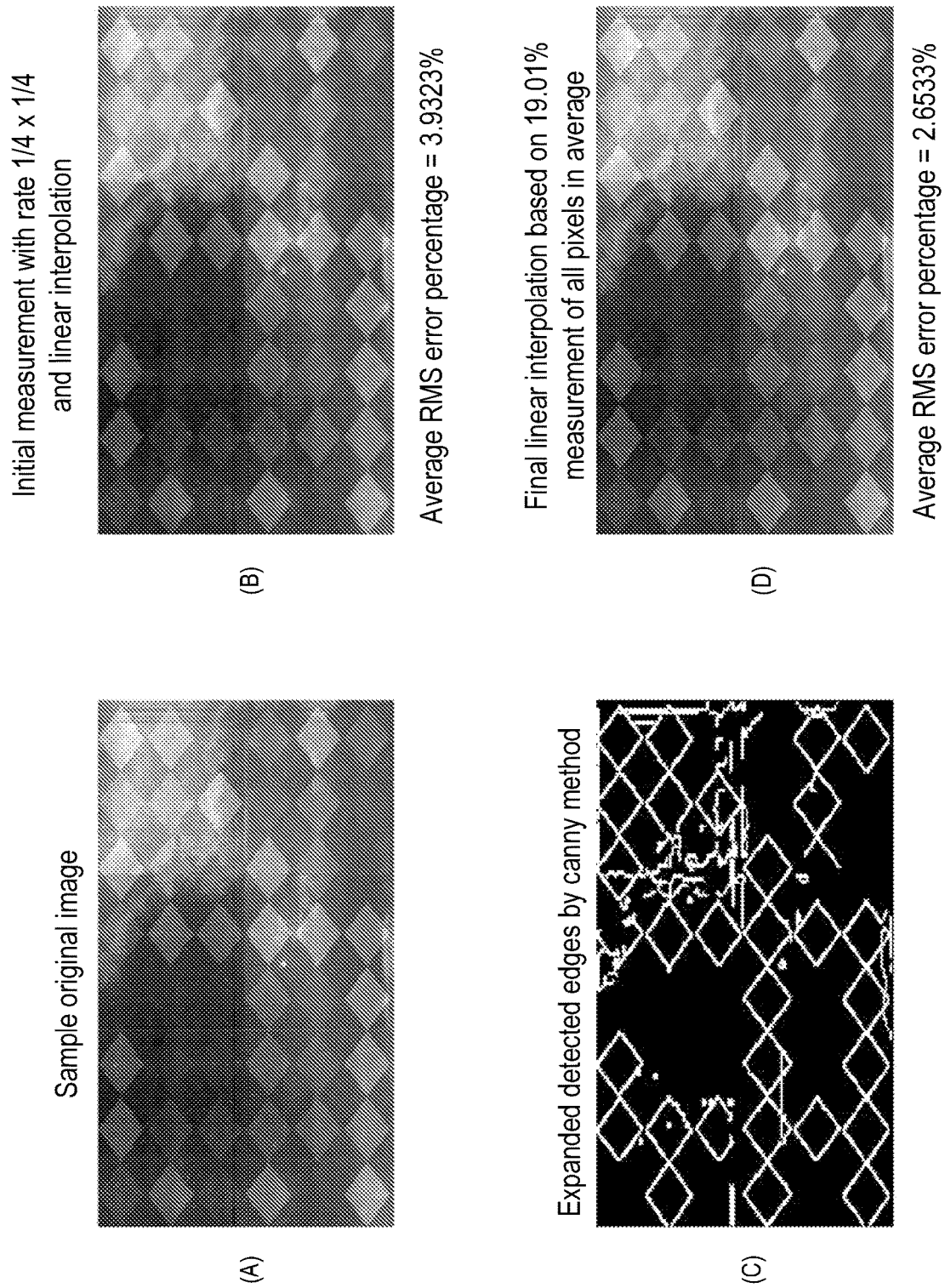
FIG. 14 shows the performance of the algorithm on the random intensity diamond pattern with the background of real initial non-uniformity for blue color.

FIGS. 12-14 show the performance of the algorithm for a random intensity diamond pattern with a background having real initial non-uniformity respectively for red, green, and blue colors. Like previous simulations, the maximum intensity of the random diamond pattern that is added to the initial non-uniformity data is 0.1 times the mean of the initial non-uniformity of the display. Thus, the aging process is in an early stage, and the display is at most 10% aged compared to its original condition. The average RMS errors equal to 8.2, 3.5, and 2.65 percent are obtained at the cost of total 21.52, 17.76, and 19.01 percent measurement of all pixels on average respectively for red, green, and blue colors.

To obtain the actual value of the performance improvement for each color, two different scenarios of uniform pixel measurement are considered, and the average of the results is taken. In the first scenario, the pixels are uniformly measured with the down-sampling rate equal to 2×2. This means that more than 25% of the pixels are initially measured. Note that this number is much larger than the number of pixels measured using the algorithm for each color. The average RMS errors equal to 10, 7.24, and 2.34 percent are obtained respectively for red, green, and blue colors. Even in this scenario, the algorithm provides more than 1.8 and 3.5 percent gain for the red and green colors. The results for the blue color are very close. In another scenario, the initial down-sampling rate of 2×3 is chosen, which means that more than 16.6% of the pixels are measured. The averaged RMS errors of 14.15, 9.97, and 3.24 percent are obtained respectively for red, green, and blue colors. By taking the average of the results in both scenarios, the algorithm herein provides more than 3.9, 5.1, and 0.15 percent gain for red, green and blue colors compared to a strictly uniform pixel measurement approach. The results are summarized in Table 2.

TABLE 2

Performance of the algorithm for the simulated aging patterns with a background of real initial non-uniformity

|  | Random Intensity Chess | | | Random Intensity diamond | | |
| --- | --- | --- | --- | --- | --- | --- |
|  | R | G | B | R | G | B |
| Pattern size | 6 × 8 | | | 6 × 8 | | |
| Initial down-sampling rate | 4 × 4 | | | 4 × 4 | | |
| Initial RMS error | 15.57 | 11.36 | 4.83 | 15.27 | 10.25 | 3.93 |
| Total Pixel measurement % | 17.12 | 14.64 | 17.62 | 21.52 | 17.76 | 19.01 |
| Final RMS error % | 9.02 | 3.95 | 2.43 | 8.22 | 3.53 | 2.65 |
| Equivalent down-sampling rate | 2 × 3 | | | 2 × 2, 2 × 3 | | |
| Equivalent RMS error % | 14.4 | 10.64 | 3.58 | 12.25 | 8.6 | 2.8 |
| Gain % | >5 | >6 | >1 | >3.9 | >5.1 | >0.15 |

The performance of the algorithm improves as the aging becomes more severe. In such a case, the edges are sharper and hence more vulnerable to be detected. In addition, assuming highly spatially correlated aged areas, most of the estimation error due to interpolation happen at the edges and their vicinity. Thus, pixel measurement at edges is more effective to reduce the estimation error. In general, the algorithm shows its best performance when it deals with highly spatially correlated areas with distinctive edges.

The algorithm herein includes an initial uniform pixel measurement and interpolation followed by an edge detection algorithm to recognize the areas that results in most part of the estimation error due to the interpolation. The pixels on the edges and their vicinity are also measured and aging pattern of the display is obtain by re-interpolation of the entire measured set of data for the initially measured pixels and the pixels around the detected edges. Numerical results on simulated aging patterns and real data demonstrate that the algorithm significantly outperforms the equivalent uniform pixel measurement counterpart. The algorithm performs particularly well for aging patterns that consist of highly spatially correlated areas with distinctive edges.

The simulation results presented here for real data are obtained based on only one set of real $V_T$ initial non-uniformity. More exact results are obtained by performing the same simulation for various sets of real data and averaging over the results.

There is a tradeoff in the choice of the initial down-sampling rate. It should be large enough to decrease the total number of pixel measurements as much as possible. At the same time, it should be small enough to capture important events (e.g., edges or corner points) of the image with a high probability. Clearly, if an edge is missed in the initial interpolation, it is not guaranteed to be recovered by the algorithm. Thus, edges that are expanded in an area smaller than the smallest area characterized by the down-sampling rate ($K_V \times K_H$ pixels), are vulnerable to be missed.

What is claimed is:

1. A method of improving images displayed by a display, the display comprising a plurality of pixels, each pixel comprising a light emitting device, the method comprising:
measuring a pixel characteristic of each pixel of a sparse subset of the pixels to produce initial pixel measurements;
performing edge detection on the initial pixel measurements to generate edge detection data;
measuring the pixel characteristic of one or more pixels selected with use of the edge detection data to produce additional pixel measurements; and
compensating an image of the display based on the initial pixel measurements and the additional pixel measurements to improve the images displayed by the display.

2. The method of claim 1, wherein the sparse subset of the pixels comprises a spaced uniform distribution of pixels.

3. The method of claim 2, wherein the spaced uniform distribution of pixels comprises a spaced rectilinear distribution of pixels.

4. The method claim 3, wherein the spaced rectilinear distribution of pixels comprises pixels of the display using a down-sampling rate of KVxKH, such that the pixel characteristic of at least every KVth pixel is measured along a column and the pixel characteristic of at least every KHth pixel is measured along a row.

5. The method of claim 1, wherein compensating the image of the display based on the initial pixel measurements and the additional pixel measurements comprises:
updating an estimation matrix stored in a memory based on the initial pixel measurements and the additional pixel measurements; and
compensating the image of the display with use of the estimation matrix.

6. The method of claim 5, wherein updating the estimation matrix based on the initial pixel measurements and the additional pixel measurements comprises interpolating a combination of the initial pixel measurements and the additional pixel measurements.

7. The method of claim 6, wherein measuring the pixel characteristic of the one or more pixels selected with use of the edge detection data comprises:
determining at least one edge in the edge detection data; and
selecting the one or more pixels within a local vicinity of the determined at least one edge in the edge detection data.

8. The method of claim 7, wherein performing edge detection on the initial pixel measurements to generate the edge detection data includes interpolating the initial pixel measurements to produce an initial pixel characteristic pattern and using an edge detection algorithm on the initial pixel characteristic pattern.

9. The method of claim 6, wherein interpolating the combination of the initial pixel measurements and the additional pixel measurements generates estimated pixel characteristics for pixels of the display other than the sparse subset of the pixels and the one or more pixels.

10. The method of claim 7, wherein performing edge detection on the initial pixel measurements to generate edge detection data comprises performing Canny edge detection on the magnitudes of the initial pixel measurements.

11. The method of claim 5, wherein the estimation matrix corresponds to a pixel resolution of the display, wherein each entry in the estimation matrix corresponds to a respective pixel of the display, and wherein each value of each entry in the estimation matrix corresponds to an amount by which the respective pixel characteristic of the pixel causes non-uniformity, such that a corresponding compensation value is applied to increase the programmed brightness for the pixel to compensate for non-uniformity caused by the pixel characteristic of the pixel.

12. The method of claim 1, wherein the pixel characteristic is related to a shift in a threshold voltage of a drive transistor that drives the light emitting device in each of the pixels.

13. The method of claim 1, wherein the pixel characteristic is related to a change in a voltage across the light-emitting device in each of the pixels.

14. The method of claim 1, wherein the pixel characteristic is related to a change in a drive current of a drive transistor needed to cause the light-emitting device in each of the pixels to emit a programmed brightness.

15. The method of claim 1, wherein the pixel characteristic is related to a change in a current of the light emitting devices needed to emit a programmed brightness.

16. A method of improving images displayed by a display, the display comprising a plurality of pixels, each pixel comprising a light emitting device, the method comprising:
measuring a pixel characteristic of each pixel of a sparse subset of the pixels to produce initial pixel measurements;
measuring the pixel characteristic of one or more pixels selected with use of the initial pixel measurements to produce additional pixel measurements; and
compensating an image of the display based on the initial pixel measurements and the additional pixel measurements to improve the images displayed by the display.

17. The method of claim 16, wherein measuring the pixel characteristic of the one or more pixels selected with use of the initial pixel measurements to produce the additional pixel measurements comprises:
determining magnitudes of the initial pixel measurements; and
selecting the one or more pixels with use of the magnitudes of the initial pixel measurements.

18. The method of claim 17, wherein selecting the one or more pixels with use of the magnitudes of the initial pixel measurements comprises:
comparing the magnitudes of the initial pixel measurements to generate comparison data; and
selecting the one or more pixels with use of the comparison data.

19. The method of claim 18, wherein comparing the magnitudes of the initial pixel measurements to generate the comparison data includes performing edge detection on the magnitudes of the initial pixel measurements to generate comparison data comprising edge detection data, and wherein selecting the one or more pixels with use of the comparison data includes selecting the one or more pixels with use of the edge detection data.

20. The method of claim 16, wherein compensating the image of the display based on the initial pixel measurements and the additional pixel measurements comprises:
updating an estimation matrix stored in a memory based on the initial pixel measurements and the additional pixel measurements; and
compensating the image of the display with use of the estimation matrix.

* * * * *